United States Patent [19]

Steinigeweg

[11] Patent Number: 4,714,878

[45] Date of Patent: Dec. 22, 1987

[54] APPARATUS FOR FORMING THE ACTUAL VALUE OF A TORQUE IN A THREE-PHASE SYNCHRONOUS MACHINE WITH CURRENT-BLOCK FEEDING

[75] Inventor: Rolf-Jürgen Steinigeweg, Herzogenaurach, Fed. Rep. of Germany

[73] Assignee: Siemens Aktiengesellschaft, Munich, Fed. Rep. of Germany

[21] Appl. No.: 840,697

[22] Filed: Mar. 18, 1986

[30] Foreign Application Priority Data

May 6, 1985 [DE] Fed. Rep. of Germany ....... 3516208

[51] Int. Cl.$^4$ ............................ G01L 3/00; H02P 5/00
[52] U.S. Cl. ............................ 324/158 MG; 318/432; 318/433
[58] Field of Search ................. 324/158 MG; 322/99; 318/432, 433; 340/648; 364/551

[56] References Cited

U.S. PATENT DOCUMENTS 4,345,198 8/1982 Wolfinger .................. 324/158 MG

FOREIGN PATENT DOCUMENTS 0065614 12/1982 European Pat. Off. .
2915987 2/1981 Fed. Rep. of Germany .
0139662 8/1983 Japan .......................... 324/158 MG Primary Examiner—Reinhard J. Eisenzopf
Assistant Examiner—Vinh P. Nguyen
Attorney, Agent, or Firm—Kenyon & Kenyon

[57] ABSTRACT

In two of the three phases of a synchronous machine, the feeding or driving current is measured. During 240° of an operating cycle of the synchronous machine, a reference signal is generated which is proportional to the measured current of one or the other of the feeding signals, whereas during the remaining 120° the magnitude of the sum of the feeding currents of the two phases constitute the reference signal.

6 Claims, 3 Drawing Figures

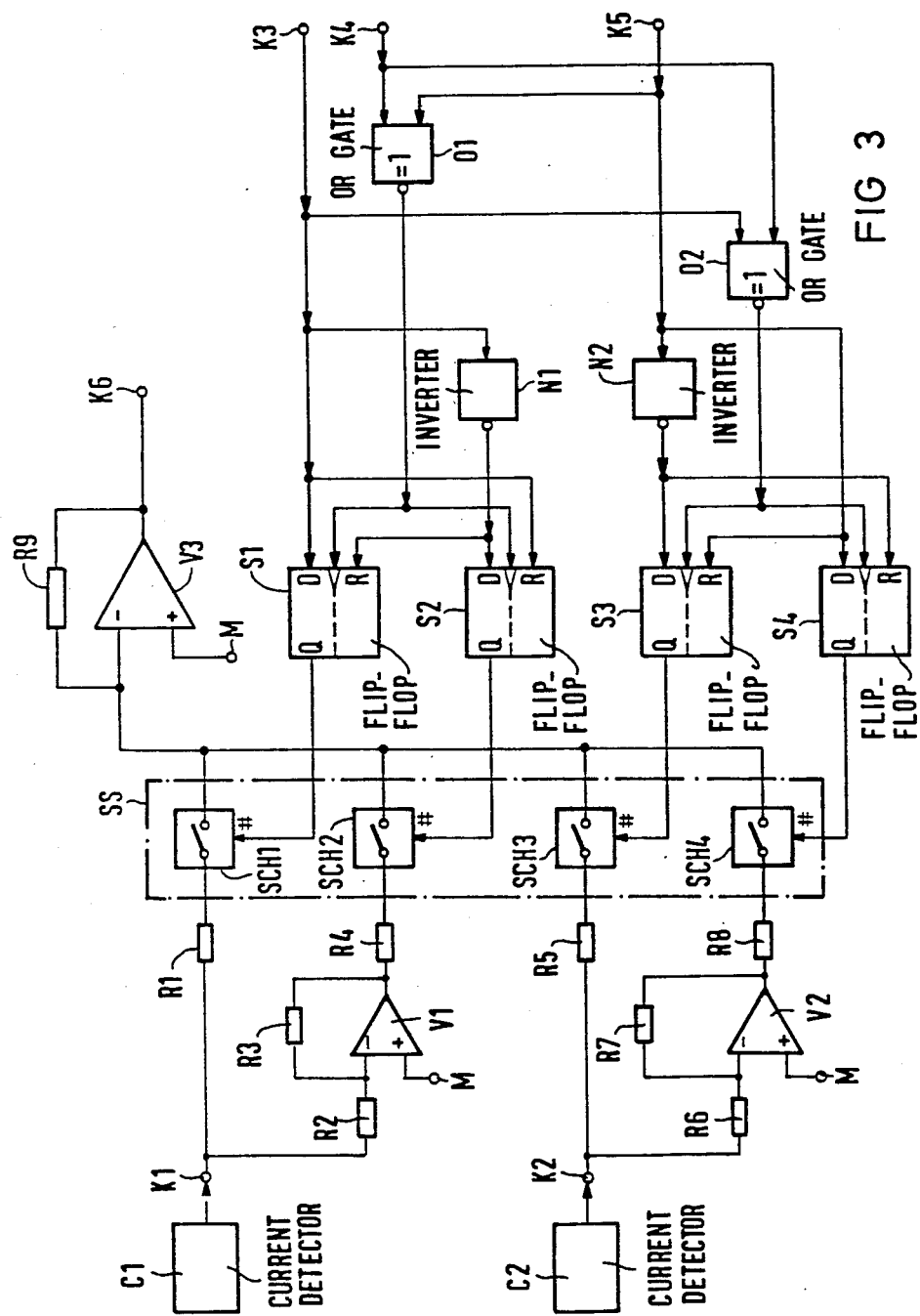

APPARATUS FOR FORMING THE ACTUAL VALUE OF A TORQUE IN A THREE-PHASE SYNCHRONOUS MACHINE WITH CURRENT-BLOCK FEEDING

BACKGROUND OF THE INVENTION

This invention relates to an apparatus for forming the actual value of a torque in a three-phase synchronous machine with current-block feeding, i.e., in a machine having windings fed with a-c current in the form of a positive rectangular wavefrom with pulses interleaved timewise with pulses of a negative rectangular waveform. The three a-c feeding currents are mutually staggered by 120° of an operating cycle of the synchronous machine, while respective gaps of 60° exist between the alternating positive and negative current blocks or pulses of each current signal. In such a system, the rise and fall of each current block, i.e., the leading and trailing edges of the current pulses, always take place within a predetermined finite time period.

Synchronous machines with trapezoidal electromotive force (EMF) characteristics generate a constant torque if the machines are fed with a-c currents having rectangular pulses. Since the voltages and currents contributing to the formation of power of all three phases are equal, the resulting actual torque value is proportional to the feeding or driving current. Because the current for each phase is zero during two 60° intervals of each machine operating cycle, the measurement of the current requires measurement and detection in at least two phases. Although the measurement of a feeding current in only two phases calls for but a small amount of hardware, a technical problem arises from the fact that no exactly rectangular current pulses exist in practice. Instead, there is a delay time (a finite interval) for the rise and fall of each current pulse. This delay must be taken into consideration in the generation of actual torque values, inasmuch as a measurement error occurs if with switching-off the block current in a first or second phase, the block current of the second or first phase, respectively, is evaluated uncorrected because the rectangular pulses of the feeding currents have a delay in their rise times so that too small a current value is measured.

An object of the present invention is to provide an improved apparatus for generating the value of a torque in a three-phase synchronous machine.

A more particular feature of the present invention is to provide such an apparatus which generates an actual torque value by measuring the feeding current in two phases.

SUMMARY OF THE INVENTION

The present invention is directed to an apparatus for forming an actual value of a torque exerted in a three-phase synchronous machine with current-block feeding wherein three a-c current signals are fed to respective phase windings of the synchronous machine. The feeding signals each take the form of a positive rectangular waveform having pulses interleaved in time with pulses of a negative rectangular waveform, each pulse of one of the rectangular waveforms being spaced in time from each adjacent pulse of the other waveform by 60° of an operating cycle of the synchronous machine. Each of the feeding signals or currents is staggered in time by 120° of an operating cycle of the synchronous machine with respect to the other two of the feeding currents. The pulses of the waveforms have leading and trailing edges where current levels change in finite amounts of time.

In accordance with the present invention, the apparatus for forming the torque value comprises a first generating component for producing a first measurement signal proportional to the current of one of the a-c feeding signals. A second generating component is provided for producing a second measurement signal proportional to the current of another of the a-c feeding signals. A third generating component is operatively connected to the first two components for producing a reference signal from exactly one (different ones at different times) of the measurement signals during 240° of an operating cycle of the synchronous machine and for generating the reference signal from a sum of the measurement signals during a remaining 120° of the operating cycle. The reference signal so produced is representative of a torque exerted in the synchronous machine.

Summing the measurement signals in accordance with the present invention serves to compensate for the measurement error heretofore described.

In accordance with another feature of the present invention, the third generating component includes a first inverter operatively coupled to the first generating component for producing a third measurement signal equal in magnitude and opposite in polarity to the first measurement signal. The third generating component further includes a second inverter coupled to the second generating component for producing a fourth measurement signal equal in magnitude and opposite in polarity to the second measurement signal. A switching device is operatively connected to the first and second generating components and to the first and second inverters for selectively transmitting the measurement signals. An adding circuit is operatively linked to the switching device for generating a sum of measurement signals transmitted by the switching device. The reference signal is available at an output of the adding circuit.

In accordance with another feature of the present invention, the beginning and the end, i.e.. the leading edge and the trailing edge, of each current pulse can be determined by a rotor position transmitter, the switching device being operated in accordance with position signals generated by the rotor position transmitter. For example, if the rotor position transmitter generates a plurality of binary signals indicative of the polarities of the feeding currents, a logic network responsive to the binary signals can be used to control operations in the switching device.

Pursuant to another particular feature of the present invention, the reference signal is generated with a polarity indicative of the direction of rotation of the synchronous machine rotor. Accordingly, the reference signal may be read to determine not only the magnitude of transmitted torque but also the direction of rotor rotation.

BRIEF DESCRIPTION OF THE DRAWING

FIG. 3 is a circuit diagram of an apparatus in accordance with the present invention for generating a value for a torque exerted by or in the synchronous machine of FIG. 1.

DETAILED DESCRIPTION

Figure 1:
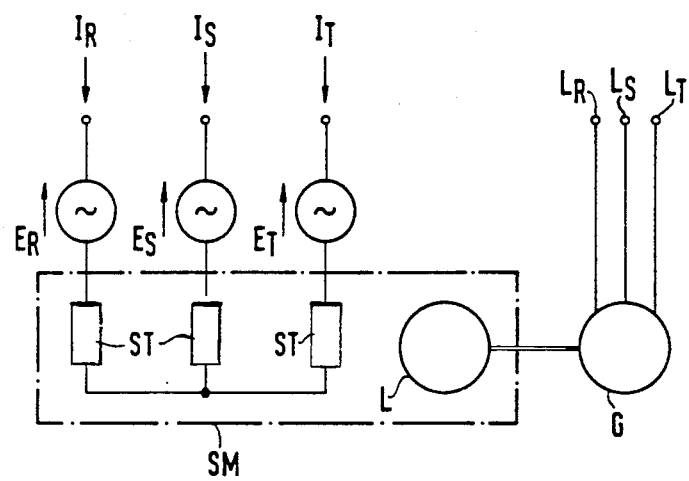
FIG. 1 is a schematic diagram of a three-phase synchronous machine exerting a torque measurable by an apparatus in accordance with the present invention.

As illustrated in FIG. 1, a synchronous machine SM has a three-phase stator winding ST receiving an electromotive force (EMF) which is indicated by arrows as electromotive force components $E_R$, $E_S$ and $E_T$ for the three phases R, S and T. Each phase is fed by a respective driving current $I_R$, $I_S$ and $I_T$ (each represented by an arrow). The waveforms of electromotive forces $E_R$, $E_S$ and $E_T$ as well as of currents $I_R$, $I_S$ and $I_T$ are shown in FIG. 2, described in detail hereinafter.

Synchronous machine SM has a rotor L, which delivers a mechanical torque and which is rigidly connected to a rotor position transmitter G. This rotor position transmitter G generates three binary position signals $L_R$, $L_S$ and $L_T$ shifted relative to each other by 120° of an operating cycle of the synchronous machine. The binary position signals are synchronized with idealized rectangular pulses of feeding or driving currents $I_R$, $I_S$ and $I_T$, as explained in the following.

Figure 2:
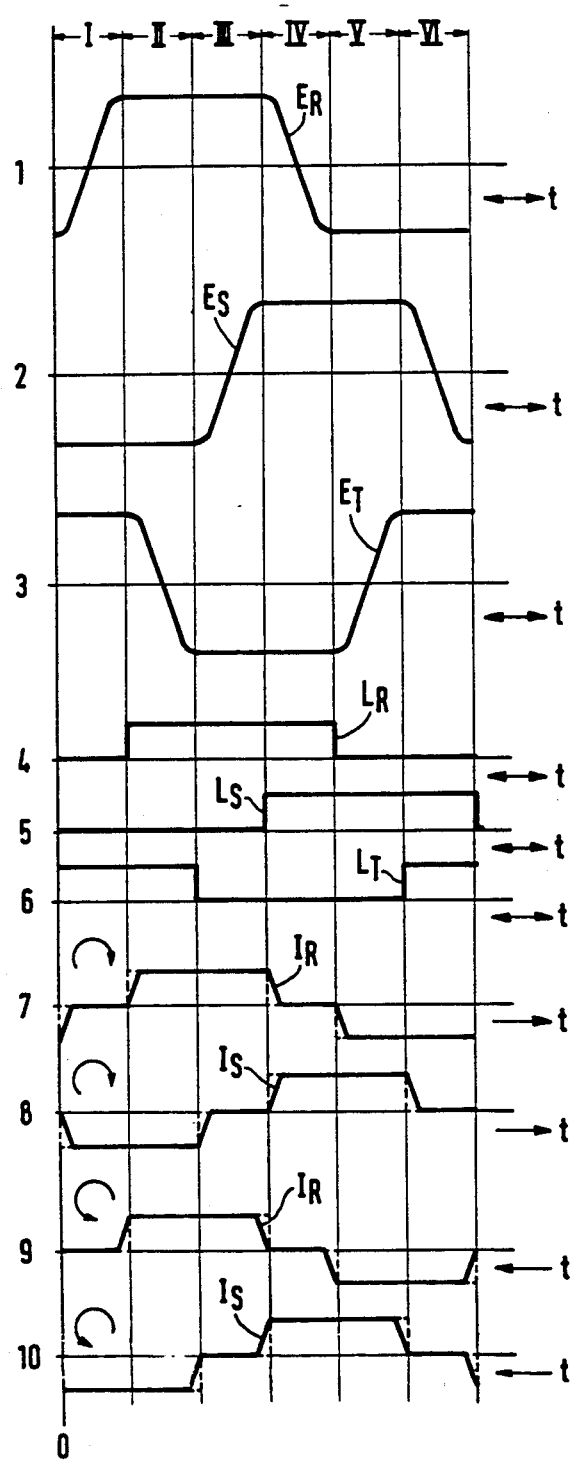
FIG. 2 is a series of graphs of selected signals produced in or by, or characteristic of, the synchronous machine of FIG. 1.

FIG. 2 shows ten timing diagrams 1 to 10 of signals transmitted in the synchronous machine of FIG. 1. One period of each signal is shown, synchronized with respect to the other signals. The time axis is designated with "t" and the waveshapes are indicated by associated arrows (simple or double headed).

The operating cycle of the synchronous machine, and concomitantly the period of the signals shown in FIG. 2, is subdivided into six intervals I to VI of 60° each. If the intervals or sections I to VI are traversed in an increasing sequence, the synchronous machine is running clockwise. If the sections I to VI are traversed in a decreasing sequence, the machine is running counterclockwise.

The first graph of FIG. 2 (signal 1) shows the waveform of electromotive force component $E_R$ In the case of clockwise rotation at the machine rotor, electromotive force component $E_R$ has a rising waveform in interval I, remains constant during intervals II and III and drops during interval IV to a value which is equal but opposed to the level of the intervals II and III.

Diagrams 2 and 3 of FIG. 2 show electromotive force components $E_S$ and $E_T$, where in the case of clockwise rotation electromotive force $E_S$ lags electromotive force $E_R$ by 120° and electromotive force $E_T$ lags electromotive force $E_S$ by 120°.

To determine the actual value of the output torque of the synchronous machine, feeding currents $I_R$ and $I_S$ are evaluated with respect to their block-shaped current pulses. Currents $I_R$ and $I_S$ are shown in the case of clockwise rotation (indicated by an arcuate arrow pointing clockwise) in diagrams 7 and 8; currents $I_R$ and $I_S$ in the case of counterclockwise rotation (arcuate arrow pointing counterclockwise) are shown in diagram 9 and 10. Currents $I_R$ and $I_S$ each comprise a positive, substantially rectangular waveform with pulses alternating or interleaved with pulses of a negative rectangular waveform. It is to be noted that in actuality currents $I_R$ and $I_S$ deviate from idealized rectangular or block-shaped waveforms indicated in dashed lines in diagrams 7 to 10 in that each current pulse rises and falls with a certain time delay, i.e., within a finite internal. Binary position signals $L_R$ and $L_S$ and $L_T$ are synchronized with each other, as shown in diagrams 4, 5 and 6 at FIG. 2. Position signals $L_R$, $L_S$ and $L_T$ are consequently shifted relative to each other by 120° of an operating cycle of the synchronous machine.

For forming a reference signal representing the actual value of a clockwise output torque, the feeding currents of phases R and S for clockwise rotation can be evaluated as follows.

During section or interval I, the sum of currents $I_R$ and $I_S$ is formed, while during interval II current $I_S$ alone is evaluated. Subsequently, during interval III, the inverted value of current $I_R$ is utilized, whereas during interval IV the sum of the currents $I_R$ and $I_S$, inverted in polarity, is calculated. During interval V the inverted value of current $I_S$ forms the reference signal and during interval VI the reference signal is derived from current $I_R$. The negative sign of the reference signal indicates clockwise rotation. The magnitude of the reference signal is proportional to the respective actual torque value of the synchronous machine.

For counterclockwise rotation, and concomitantly counterclockwise torque, the following conditions exist. During interval VI the sum of inverted values of currents $I_R$ and $I_S$ is used to form the reference signal, while during interval V the inverted value of current $I_R$ alone is used. During subsequent intervals IV and III current $I_S$ alone and then the sum of currents $I_R$ and $I_S$ is evaluated. During penultimate interval II, current $I_R$ alone is used and during interval I, the inverted value of current $I_S$ forms the reference signal. The resulting reference signal indicates counterclockwise rotation by a positive sign. The magnitude of the reference signal is a measure for the current actual torque value.

A circuit arrangement implementing such an evaluation scheme is shown in FIG. 3. Via terminals K1 and K2, measurement signals corresponding to currents $I_R$ and $I_R$, respectively, are fed to the circuit from a pair of current detecting devices C1 and C2. Position signals $L_R$, $L_S$ and $L_T$ are transmitted from rotor position transmitter G to terminals K3, K4 and K5. At a terminal K6, the reference signal corresponding to the actual torque value is available.

The circuit arrangement of FIG. 3 is designed so that the measurement signals corresponding to respective currents $I_R$ and $I_S$ are fed via respective resistors R1 and R5 to a switching stage SS. In addition, inverted counterparts of these measurement signals are transmitted via resistors R4 and R8 to switching stage SS. Resistors R1, R4, R5 and R8 all have a common resistance.

The measurement signal for current $I_R$ is inverted by an inversion stage comprising an operational amplifier V1 having a noninverting input at ground potential M and an inverting input connected to terminal K1 via a resistor R2 and to the output of the operational amplifier V1 via a resistor R3. Resistors R2 and R3 have the same resistance value. Consequently, a pure inversion (gain 1) of the measurement signal from terminal K1 is produced.

Similarly, inversion of the measurement signal corresponding to current $I_S$ is accomplished by an operational amplifier V2 with a grounded noninverting input and an inverting input connected to terminal K2 via a resistor R6, which has a resistance equal to that of resistor R2. Operational amplifier V2 has an output tied to resistor R8 and fed back via a resistor R7 to the inverting input of operational amplifier V2. Resistor R7 has a resistance value of equal to that of resistor R3.

Switching stage SS includes four electronic switches SCH1, SCH2, SCH3 and SCH4. To switch SCH1 is fed the noninverted measurement signal corresponding to current $I_R$, while the inverted measurement signal corresponding to current $I_R$ is transmitted to switch SCH2. Switches SCH3 and SCH4 receive the noninverted measurement signal corresponding to current $I_S$ and the associated inverted measurement signal, respectively. Switches SCH1, SCH2, SCH3 and SCH4 have outputs working into an inverting input of an operational amplifier V3 with a noninverting input at ground potential M. Operational amplifier V3 has an output connected to the inverting input of the operational amplifier V3 via a resistor R9, the resistance of which equals that of resistors R1, R4, R5 and R8, individually.

Together with the resistors R1, R4, R5, R8 and R9, operational amplifier V3 represents an inverting adding stage which enables the above-described evaluation of the measurement signals corresponding to currents $I_R$ and $I_S$.

In order to ensure synchronization so that pulses of the feeding currents are measured as the currents $I_R$ and $I_S$, a logic control circuit comprising storage members S1, S2, S3 and S4, as well as logic inverters N1 and N2 and OR gates 01 and 02, is provided. Storage members S1-S4 are D-type flip-flops with R-input. The binary logic circuit of FIG. 3 is designed so that, if the synchronous machine SM rotates clockwise, both switches SCH2 and SCH4 are closed during interval I, only switch SCH4 is closed during interval II, only switch SCH1 is closed during interval III, both switches SCH1 and SCH3 are closed during interval IV, only switch SCH3 is closed during interval V, and only switch SCH2 is closed during interval VI.

For clockwise rotation, the following conditions apply. Only switch SCH3 is closed during interval I; only switch SCH2 is closed during interval II; both switches SCH2 and SCH4 are closed during interval III; only switch SCH4 is closed during interval IV; only switch SCH1 is closed during interval V; and switches SCH1 and SCH3 are closed during interval VI.

Although the invention has been described in terms of particular embodiments and modifications, one of ordinary skill in the art, in light of this teaching, can generate additional embodiments and modifications without departing from the spirit of or exceeding the scope of the claimed invention. Accordingly, it is to be understood that the drawings and illustrations herein are proffered by way of example to facilitate comprehension of the invention and should not be construed to limit the scope thereof.

What is claimed is:

1. An apparatus for forming an actual value of a torque exerted in a three-phase synchronous machine, said synchronous machine having current-block feeding wherein three a-c current signals are fed to respective windings of said synchronous machine, each of said signals taking the form of a positive rectangular waveform having pulses interleaved in time with pulses of a negative rectangular waveform, each pulse of one of the rectangular waveforms being spaced in time from each adjacent pulse of the other of said waveforms by 60° of an operating cycle of said synchronous machine, each of said signals being staggered with respect to the other two of said signals by 120° of an operating cycle of said synchronous machine, the pulses of said waveforms having leading and trailing edges where current levels change in finite amounts of time, said apparatus comprising:

first generating means for producing a first measurement signal proportional to the current of one of the a-c current signals;

second generating means for producing a second measurement signal proportional to the current of another of said a-c current signals;

third generating means operatively connected to said first generating means and said second generating means for producing a reference signal from exactly one of said first measurement signal and said second measurement signal during 240° of an operating cycle of the synchronous machine and for generating said reference signal from a sum of said first measurement signal and said second measurement signal during a remaining 120° of said operating cycle, said reference signal being representative of a torque exerted in said synchronous machine.

2. The apparatus defined in claimed 1 wherein said third generating means includes first inverter means operatively coupled to said first generating means for producing a third measurement signal equal in magnitude and opposite in polarity to said first measurement signal, second inverter means operatively coupled to said second generating means for producing a fourth measurement signal equal in magnitude and opposite in polarity to said second measurement signal, switching means operatively connected to said first and said second generating means and to said first and said second inverter means for selectively transmitting the measurement signals, and adding means operatively linked to said switching means for generating a sum of measurement signals transmitted by said switching means, said reference signal being available at an output of said adding means.

3. The apparatus defined in claim 2 wherein said third generating means further includes control means operatively connected to said switching means for controlling the switching operations thereof in accordance with the leading and trailing edges of the pulses of said waveforms.

4. The apparatus defined in claim 3, further comprising means for determining when said leading and trailing edges occur, said means for determining including a rotor position transmitter operatively coupled to said control means for transmitting thereto position signals encoding information including the times of occurrence of said leading and trailing edges.

5. The apparatus defined in claim 1, 2, 3 or 4, wherein said reference signal has a polarity which depends on the direction of rotation of said synchronous machine.

6. An apparatus for forming an actual value of a torque exerted in a three-phase synchronous machine, said synchronous machine having current-block finding wherein three a-c current signals are fed to respective windings of said synchronous machine, each of said signals taking the form of a positive rectangular waveform having pulses interleaved in time with pulses of a negative rectangular waveform, each pulse of one of the waveforms being spaced in time from each adjacent pulse of the other of said waveforms by 60° of an operating cycle of said synchronous machine, each of said signals being staggered in time with respect to the other two of said signals by 120° of the operating cycle of said synchronous machine, the pulses of said waveforms having leading and trailing edges whose current levels change in finite amounts of time, said apparatus comprising:

first generating means for producing a first measurement signal proportional to the current of one of the a-c current signals;

second generating means for producing a second measurement signal proportional to the current of another of said a-c current signals;

first inverter means connected to said first generating means for generating a first inverted signal equal in magnitude and opposite in polarity to said first measurement signal;

second inverter means connected to said second generating means for generating a second inverted signal equal in magnitude and opposite in polarity to said second measurement signal;

switching means operationally linked to said first and said second generating means and to said first and said second inverter means for selectively transmitting said first and said second measurement signal and said first and said second inverter signal;

adding means operatively coupled to said switching means for generating sums of signals transmitted therefrom;

third generating means responsive to rotation of a rotor of said synchronous machine for producing a plurality of signals containing information as to the leading and trailing edges of the pulses of the a-c current signals; and control means operatively tied to said switching means and said third generating means for operating said switching means at the beginnings of six equispaced time intervals during the operating cycle of said synchronous machine to transmit to said adding means one of said first and said second measurement signal and said first and said second inverted signal during four of said time intervals and to transmit to said adding means one of said first measurement signal and said first inverted signal and one of said second measurement signal and said second inverter signal during the other two of said time intervals.

* * * * *